Patented Dec. 1, 1931

1,834,420

UNITED STATES PATENT OFFICE

RALPH H. PRICE, OF CHICAGO, ILLINOIS, ASSIGNOR TO THE GLUE RESEARCH CORPORATION, OF NEW YORK, N. Y., A CORPORATION OF NEW YORK

FIBER SEALER

No Drawing. Application filed September 12, 1930. Serial No. 481,598.

My invention relates to a product for use in sealing wood which has been previously colored with bleeding stains.

Another object of my invention is to provide a product for coating porous materials, such as fiberboard, etc., with a non-penetrable coating, rendering it possible to obtain a satisfactory color and finish by the use of a relatively light coat of the final more expensive coating materials, such as paints, enamels or lacquers, which if applied directly to the fiberboard itself would be absorbed.

My invention provides a coating comprising glue and a solvent for the glue, such as water, and agent for plasticizing the glue, as for example—glycerine, ethylene, glycol, Turkey red oil and the like, and an organic solvent, such as denatured alcohol and inorganic fillers, such as silica and lithopone.

A preferred formula is as follows:

| | Per cent |
|---|---|
| Glue (low test bone glue) | 12.8 |
| Water | 21.4 |
| Glycerine (95% strength) | 4.3 |
| Specially denatured alcohol | 19.9 |
| Silica (300 mesh) | 19.0 |
| Lithopone | 22.6 |

In practice the composition is prepared by using one-half of the total amount of water in the formula, making up a 1.75% solution of sulphuric acid and mixing the glue with this acid solution, allowing it to stand for approximately an hour to permit the glue to absorb the water. This solution is then heated to the boiling point and maintained at substantially that temperature until the glue has been sufficiently hydrolyzed so that a sample of the solution diluted to contain 20% of glue will have a melting point between 2° and 4° C. The mixture is then cooled and neutralized so that the pH will be between 6.8 and 7.2. The solution is then prepared by comprising all of the glycerine in the formula and 60% of the alcohol. This solution is added slowly with very vigorous stirring to the hydrolyzed glue solution which is at a temperature at which it is freely fluid, but below the boiling point of alcohol. When the glycerine-alcohol mixture has been added and stirring has been continued until a perfectly homogeneous mass is obtained, the lithopone and silica are added and the mixture passed through a paint mill to insure thorough mixing. The remaining quantities of water and alcohol are then mixed and added with constant stirring to complete the composition.

The product when prepared as hereinbefore described, has been found satisfactory for use as a sealer for wood colored with bleeding stains, in order to prevent contamination of the top coat of paint or other covering by such stain.

Where it is desired to seal the surface of porous material, such as fiberboard, in order that it may be economically finished with paint, enamel or lacquer, I prepare five parts of the product substantially as above, and add one part of boiled linseed oil. This renders the coating more waterproof and more desirable as a sealer for fiberboard and the like.

I claim:

The method of preparing a sealer for wood, which said wood is colored with bleeding stains, which method consists in first hydrolyzing glue by subjecting to a weak solution of sulphuric acid, by boiling and diluting, then cooling and neutralizing, then adding to such hydrolyzed glue a solution of glycerine and alcohol while such hydrolyzed glue is at a temperature at which it is freely fluid, but below the boiling point of alcohol, then adding fillers and milling the mixture, subsequently adding water and alcohol.

RALPH H. PRICE.